United States Patent Office 2,741,599
Patented Apr. 10, 1956

2,741,599

COMPOSITION FOR CLEANING AND STRIPPING PAINT FROM ALUMINUM

Louis McDonald, Altadena, and Alfred E. Hawley, Long Beach, Calif., assignors to Kelite Corporation, Los Angeles, Calif., a corporation of California No Drawing. Application April 28, 1952,
Serial No. 284,824

5 Claims. (Cl. 252—138)

This invention relates to a composition for cleaning paint, soil and other undesirable coatings from aluminum and anodized aluminum surfaces, and is particularly directed to cleaning compositions of the type which are alkaline cleaners buffered and inhibited against corrosion.

Various chemical agents have been utilized for removal of soil and undesirable coatings from aluminum and anodized aluminum surfaces. Soils and coatings composed of hydrocarbon oil, saponifiable oils, greases, protective coatings, such as enamel, zinc chromate primer, etc. are readily removed by various organic solvents, such as low molecular weight alcohols, esters, ketones, chlorinated hydrocarbons and aromatic hydrocarbons which may be fortified or activated with various wetting agents and peptizers. While agents of this type are effective in their ability to deterge and remove various soils and coatings they possess certain physical, chemical and physiological properties which render them unsuitable for industrial use. In general, these materials are toxic and/or flammable. Additionally, certain of the agents, such as trichlorethylene, are undesirably corrosive to aluminum and anodized aluminum under conditions prevalent to many industrial cleaning and paint stripping operations.

The foregoing adverse behavior of organic detergent and stripping agents, coupled with their high cost have promulgated the extensive industrial use of various inorganic materials for cleaning and stripping aluminum surfaces. Light soils and greases are readily removed at moderate temperatures of the order of 120 to 140° F. by the use of alkaline cleaners buffered and inhibited against corrosion, such as the composition described in the patent to Hart, No. 2,381,124. Cleaners of this nature are formed of alkali salts, such as sodium phosphates, borates and carbonates, which are the alkali activating and buffer constituents, and silicates which, when in proper ratio to the alkali present, act as corrosion inhibitors to inhibit the corrosion of aluminum. Water solutions of the cleaners of this type have a pH of from 10.4 to 11.8 and do not exhibit corrosive attack on the aluminum, aluminum alloys or anodized aluminum. For such alkaline cleaners there is little possibility of the "throw down" of aluminum salts or insoluble silicates on the aluminum by the cleaning composition if the cleaning bath is operated at temperatures of the order of about 160° F.

For the removal of heavy soil, greases, paints, enamels and prime coats it is necessary, however, to use a cleaner of higher alkalinity and to maintain the bath at higher temperatures. Paint, enamel and primer coat film require a high concentration of hydroxyl ions for activation or removal. Accordingly, in formulating a cleaning composition for this purpose it is necessary to utilize large proportions of silicate to inhibit the attack of aluminum and anodized surfaces to hydroxyl ions. In general it has been found desirable to use a ratio of 1 Na₂O to 0.9 to 1.1 SiO₂ to inhibit the attack on the metal. While a composition of such formulation will activate paint films and remove heavy soil without attacking metals, the silicates present frequently become insolubilized at operating temperatures of 160 to 180° F. and are disposed upon the object being cleaned.

The general object of the present invention is to provide an aluminum cleaning composition which will clean and brighten aluminum surfaces and which will remove organic protective and decorative coatings from aluminum and anodized surfaces at high temperature without exhibiting corrosive attack on the metal and without depositing or "throwing down" insoluble silicates and aluminum salts on the surfaces being cleaned.

We have discovered that the above indicated objective can be accomplished by the incorporation in alkaline cleaner compositions of certain agents which are effective in sequestering aluminum and salts of other metals used in alloying aluminum and certain agents which are effective in dispersing insolubilized silicate corrosion inhibitors. By means of the alkaline cleaning composition of the present invention a cleaning bath may be maintained at a sufficiently high pH to activate paint films, remove heavy soils, greases, enamels and primer coatings and at the same time contain sufficient amounts of silicate to inhibit corrosion. The sequestering of the dissolved aluminum and salts of other metal used in alloying aluminum is effected by incorporating in the composition a sequestering agent selected from the group consisting of the alkali, amine or ammonia salts of polyhydroxy carboxylic acids of which sodium gluconate is the preferred example. The dispersing of the insolubilized silicates in the cleaning bath is effected in the present invention by the incorporation of an organic dispersing agent of the aryl sulfonate formaldehyde condensation type, of which polymeric tetramethylene phenyl sodium sulfonate is a preferred example.

The composition of the present invention generally consists of about 80 to 90% of alkali activator and corrosion inhibiting agents. Included in these agents are sodium silicates in which the SiO₂ content is generally equivalent to about 11 to 19% of the composition, and the Na₂O content of the composition (including any present in the salts of polyhydroxy carboxylic acids used as sequestering agents) is generally in the ratio of 1 mol of Na₂O to form 0.9 to 1.1 mols of SiO₂, i. e., the percentage composition of the Na₂O content is generally from substantially 10 to substantially 21% of the composition. The silicate content of the composition is preferably provided by the addition of sodium trisilicate but other silicates, such as metasilicates or orthosilicates, may be used since the material consideration in the composition of the present invention is not the form in which the silicates are added to the composition or the form that the alkali activators are added, but the maintenance of the proper mol or ratio between the Na₂O and the SiO₂ contents so that less alkaline or more alkaline silicate compound, when added to the composition of the present invention, can be compensated for by the addition of more alkaline or less alkaline activator components, such as the sodium phosphate, carbonate, borate, or even in certain cases by the addition of caustic soda. The alkali activator components are formed by the addition to the composition of sodium phosphates, carbonates or borates which also act as buffering ingredients and in some cases some caustic soda may be employed. There is a wide selection of such compounds available and they should be selected so when the composition of the present invention is dissolved in water at a preferred concentration of 8 ounces per gallon the bath possesses a pH of 10.4 to 11.8. Generally we prefer to form the alkali activator and corrosion inhibiting component of the composition (which constitutes from 80 to 90% of the admixture) by employing trisodium phosphate from 40 to 65%; sodium trisilicate (G brand silicate, Phila. Quartz Co.) 15 to 25%; and sodium carbonate 4 to 12%.

The composition also includes from 2 to 6% of the sequestering agent and is selected from the group consisting of the alkali, amine or ammonia salts of polyhydroxy carboxylic acid. The preferred sequestering agent is sodium gluconate but other salts of polyhydroxy carboxyclic acids may be employed, such as sodium saccharate, sodium citrate, sodium glutarate or the amine or ammonia salts of the acids of said components. The dispersing agent is generally employed in the composition in the proportion of 1 to 5%. Well known agents for dispersing insolubilized compounds in chemical products, such as methyl cellulose ether and sodium carboxy methyl cellulose are unsatisfactory for the purposes of the present invention since these are unstable if employed over a long period of time at high temperatures utilized in the cleaning bath produced from the composition of the present invention.

The preferred dispersing agents are polymeric tetramethylene phenyl sodium sulfonates. The dispersing agents such as the commercially available product Dewey and Almy Chemical Company's Daxad #11 may be used which are synthesized by sulphonating an aryl hydrocarbon such as benzene, napthalene or anthracene and treating the sulphonate with formaldehyde to form substituent methylene groups and to condense aryl nuclei to a polymeric compound. All such materials may be classified as aryl sulfonate formaldehyde condensates.

The composition should also generally include a wetting agent which is in the proportion of 3 to 7% of the composition, which wetting agent may be either of the soap type or the non-soap type of wetting agent. Common soap or potassium soap is suitable and any of the common non-soap detergents are also useful. Such products as Oronite, etc., are satisfactory.

The following is a preferred composition of the present invention:

|  | Percent |
|---|---|
| Trisodium phosphate monohydrate | 61.5 |
| Sodium trisilicate | 20.5 |
| Sodium carbonate | 8.0 |
| Sodium gluconate | 4.0 |
| Polymeric tetramethylene phenyl sodium sulphonate | 2.0 |
| Potassium oleate | 4.0 |

Such composition when dissolved in water in concentrations of 1 to 20 ounces per gallon has a pH of between 11.45 and 11.75. The composition may be employed at high operating temperatures, such as 160 to 180° F. without corrosion of the aluminum and without "throw down" of aluminum or other metal salts or of insoluble silicates at such high operating temperatures. The composition is very effective in the removal of heavy soil, greases, paints, enamels and primer coats from aluminum and aluminum alloys and anodized aluminum surfaces.

It is possible to add other ingredients to the composition of the present invention without departing from the principle and scope of the invention, such, for example, as water softening agents, sodium tripolyphosphate or ethylene diamine tetra sodium acetate.

While the particular example of the invention herein described is well adapted to carry out the objects of the invention this invention is of the scope set forth in the following claims.

We claim:

1. A composition for cleaning and stripping paint from aluminum which consists essentially of, sodium carbonate and trisodium phosphate as activators, a sodium silicate as a corrosion inhibiting agent, sodium gluconate, polymeric tetramethylene phenyl sodium sulphonate, and a wetting agent, the mol ratio of $Na_2O$ to $SiO_2$ being from 1 $Na_2O$ to 0.9 to 1.1 $SiO_2$, the alkali activators and corrosion inhibitors content together comprising 80 to 90% of the composition, the $SiO_2$ content being from 11 to 19%, the sodium gluconate content being from 2 to 6%, and the polymeric tetramethylene phenyl sodium sulphonate content being from 1 to 5%.

2. A composition for cleaning and stripping paint from aluminum which composition consists essentially of 80 to 90% sodium activator compounds and silicate corrosion-inhibiting agents providing a mol ratio of $Na_2O$ to $SiO_2$ of from one mol $Na_2O$ to from 0.9 to 1.1 mols of $SiO_2$, the $SiO_2$ content being from 11 to 19%, 2 to 6% of a sequestering agent selected from the group consisting of alkali, amine and ammonia salts of polyhydroxy carboxylic acids, 1 to 5% of a dispersing agent consisting of a polymeric tetramethylene aryl sodium sulfonate wherein the aryl radical is selected from the group consisting of benzene, naphthalene and anthracene, and 3 to 7% of a wetting agent.

3. A composition for cleaning and stripping paint from aluminum, which composition consists essentially of from 4 to 12 per cent of sodium carbonate and from 40 to 65 per cent of trisodium phosphate monohydrate as activator; a corrosion-inhibiting agent comprising from 15 to 25 per cent of sodium trisilicate; from 2 to 6 per cent of sodium gluconate; from 1 to 5 per cent of polymeric tetramethylene phenyl sulfonate; and 3 to 7 per cent of a wetting agent.

4. A composition for cleaning and stripping paint from aluminum, which composition consists essentially of sodium activator compounds, a silicate corrosion inhibitor therefor, said activator compounds and inhibitor together representing about 80 to 90 per cent of the total composition and the $Na_2O$ to $SiO_2$ mol ratio thereof being from 1 $Na_2O$ to 0.9 to 1.1 $SiO_2$ and the $SiO_2$ content being from about 11 to 19 per cent; from 2 to 6 per cent of sodium gluconate; from 1 to 5 per cent of a dispersing agent consisting of a polymeric tetramethylene aryl sodium sulfonate wherein the aryl radical is selected from the group consisting of benzene, naphthalene and anthracene; and from 3 to 7 per cent of a wetting agent.

5. A composition for cleaning and stripping paint from aluminum, which composition consists essentially of sodium activator compounds, a silicate corrosion inhibitor therefor, said activator compounds and inhibitor together representing about 80 to 90 per cent of the total composition and the $Na_2O$ to $SiO_2$ mol ratio thereof being from 1 $Na_2O$ to 0.9 to 1.1 $SiO_2$ and the $SiO_2$ content being from about 11 to 19 per cent; from 2 to 6 per cent of sodium gluconate; from 1 to 5 per cent of polymeric tetramethylene phenyl sodium sulfonate; and from 3 to 7 per cent of a wetting agent.

References Cited in the file of this patent

UNITED STATES PATENTS

| 2,381,124 | Hart | Aug. 7, 1945 |
| 2,584,017 | Dvorkovitz | Jan. 29, 1952 |
| 2,614,992 | Mankowich | Oct. 21, 1952 |
| 2,615,846 | Dvorkovitz | Oct. 28, 1952 |